Feb. 24, 1959 R. J. EHRET 2,875,284

ELECTRICAL AMPLIFYING MEANS

Filed Dec. 22, 1955

INVENTOR.
ROBERT J. EHRET

BY Arthur H. Swanson

ATTORNEY.

United States Patent Office 2,875,284

Patented Feb. 24, 1959

2,875,284

ELECTRICAL AMPLIFYING MEANS

Robert J. Ehret, Palo Alto, Calif., assignor to Minneapolis-Honeywell Regulator Company, Minneapolis, Minn., a corporation of Delaware Application December 22, 1955, Serial No. 554,708

9 Claims. (Cl. 179—171)

A general object of the present invention is to provide a new and improved amplifying means. More specifically, the present invention relates to transistor amplifying means wherein a plurality of transistors are operated in parallel.

In the application of transistors to control circuits it is often necessary to supply a substantial amount of current to the load. The amount of this current, however, may be beyond that which can be supplied by a single transistor and thus the need arises for a means of combining transistor outputs. In the vacuum tube art, this problem can be solved by utilizing two vacuum tubes connected in parallel. Transistors, however, unlike vacuum tubes generally have a low input impedance and a high output impedance. As a result, when two transistors having slightly different input impedances are connected in parallel, in the manner in which vacuum tubes are connected when they are operated in parallel, the unit having the lowest input impedance will supply, in accordance with its gain, a disproportionate share of current to the load. Since transistor input impedance decreases with increasing transistor current, this inequality is made still greater and in the extreme case can result in the destruction of a unit attempting to supply more than it rated current to the load.

Accordingly, it is a specific object of the present invention to provide means for successfully operating a plurality of transistors in parallel.

Another object of the present invention is to provide means for dividing an input current equally between transistors operating in parallel despite differences in transistor input impedances.

A still further object of the present invention is to employ an excess of the current flowing in the input circuits of one or more of a plurality of transistors connected in parallel to induce voltages which will reduce the excess currents flowing therein and increase the current flow in the input circuits to the others of the parallel connected transistors.

The various features of novelty which characterize this invention are pointed out with particularity in the claims annexed to and forming part of this specification. For a better understanding of the invention, its advantages, and the specific objects obtained with its use, reference should be had to the accompanying drawings and descriptive matter in which are illustrated and described preferred embodiments of this invention.

Figure 1:
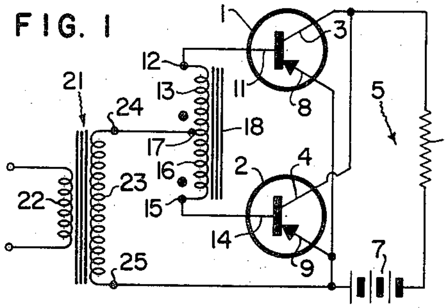
Fig. 1 is a circuit diagram of an embodiment of the present invention wherein two transistors, connected in the common emitter configuration, are operated in parallel.

Referring now to Fig. 1, there is shown a circuit diagram of an embodiment of the present invention wherein a pair of transistors 1 and 2 is operated in parallel. The transistors 1 and 2 are p. n. p. junction type transistors having the usual emitter, collector, and base electrodes. As shown, the collector 3 of the transistor 1 and the collector 4 of the transistor 2 are connected to one end terminal of a load circuit 5. The load circuit 5 comprises a circuit load, shown here as a resistor 6, connected in series with a source of transistor energizing current, shown as the battery 7. The emitter 8 of the transistor 1 and the emitter 9 of the transistor 2 are connected to the other end terminal of the load circuit 5. Thus, the output circuits of both transistors are connected in parallel to the load circuit.

The base 11 of the transistor 1 is connected to an end terminal 12 of a winding 13. The base 14 of the transistor 2 is connected to an end terminal 15 of a winding 16. The other end terminals of the windings 13 and 16 are connected together to form a center tap 17. The windings 13 and 16 are inductively coupled to each other and wound on a common core 18 in such a manner that a current flowing through one of said windings from the center tap will induce voltages across said windings having the instantaneous polarities indicated by the polarity marks.

The signal input to the circuit of Fig. 1 is by way of an input transformer 21. The input transformer 21 has a primary winding 22 and a secondary winding 23 having end terminals 24 and 25. The end terminal 24 of the secondary winding 23 is connected to the center tap 17 of the windings 13 and 16. The end terminal 25 of the secondary winding 23 is connected to the emitters 8 and 9 of the transistors 1 and 2 respectively. Thus, the input circuits of the transistors 1 and 2 are connected in parallel to the input signal source through the windings 13 and 16. The emitters 8 and 9 of the transistors 1 and 2 are common to both the input and output circuits and the transistors are said to be connected in the common emitter configuration.

In the operation of the circuit of Fig. 1 the windings 13 and 16 function to maintain the input currents to the transistors equal despite differences in the input impedances of the transistors. If an input signal is applied to the circuit such that the end terminal 24 of the secondary winding 23 of the input transformer 21 is negative with respect to the end terminal 25, currents will flow in the base electrodes of the transistors 1 and 2 in proportion to the input impedances of those transistors. If, for example, the transistor 2 has a lower input impedance than the transistor 1, there will be voltages induced in the windings 13 and 16 due to the unequal current flows through these windings. The polarity of these voltages will be such as to make the end terminal 15 more positive than the center tap 17 and the center tap 17 more positive than the end terminal 12. Thus, the voltage across the winding 13 will reinforce the input signal voltage to the transistor 1 and the voltage across the winding 16 will subtract from the input signal voltage to the transistor 2. In this manner, the input voltages to the transistors will adjust themselves to keep the input currents to the transistors approximately equal despite differences in the transistors' input impedances. If the transistors 1 and 2 have approximately equal currentg ain they will deliver approximately equal amounts of current to the load.

Figure 2:
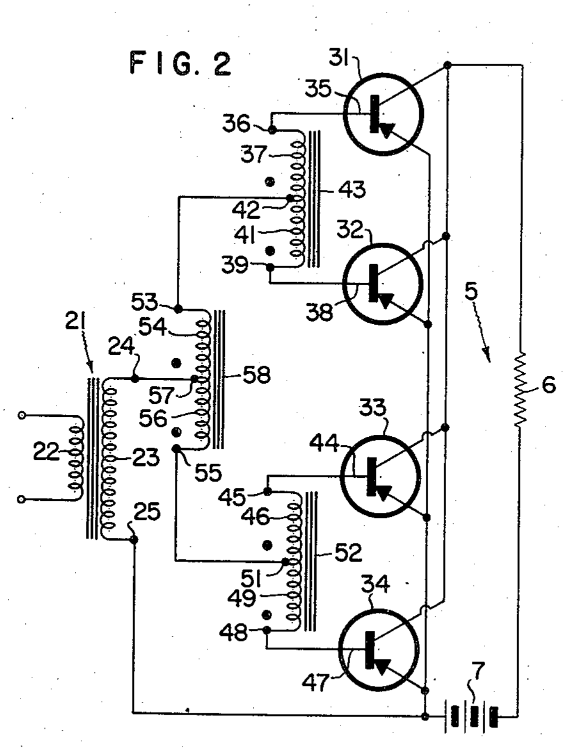
Fig. 2 is a circuit diagram of a modification of the embodiment of the present invention shown in Fig. 1, wherein four transistors are operated in parallel.

Referring now to Fig. 2, there is shown a modification of the present invention wherein there are four transistors 31, 32, 33, and 34 operated in parallel. As shown, the collector-emitter circuit of each of the transistors is connected in parallel with a load circuit 5, comprising the load resistor 6 connected in series with a source of transistor energizing current, the battery 7. The base 35 of the transistor 31 is connected to an end terminal 36 of a winding 37. The base 38 of the transistor 32 is connected to an end terminal 39 of a winding 41. The other end terminals of the windings 37 and 41 are connected together to form a center tap 42. The windings 37 and 41 are inductively coupled to each other and wound on a common core 43 in such a manner that a current flowing from the center tap through one of the windings will induce voltages across the windings having the instantaneous polarities indicated by the polarity marks. Similarly, the base 44 of the transistor 33 is connected to an end terminal 45 of a winding 46 and the base 47 of the transistor 34 is connected to an end terminal 48 of a winding 49. The other end terminals of the windings 46 and 49 are connected together to form a center tap 51. The windings 46 and 49 are inductively coupled to each other and wound on a common core 52 in the same manner as the windings 37 and 41 are wound on the core 43.

The center tap 42 of the windings 37 and 41 is connected to an end terminal 53 of a winding 54 and the center tap 51 of the windings 46 and 49 is connected to an end terminal 55 of a winding 56. The other end terminals of the windings 54 and 56 are connected together to form a center tap 57. The windings 54 and 56 are also inductively coupled to each other and wound on a common core 58 in the same manner as the windings 37 and 41 are wound on the core 43.

As in the circuit of Fig. 1, the signal input to the circuit of Fig. 2 is by way of an input transformer 21. The input transformer 21 has a primary winding 22 and a secondary winding 23 having end terminals 24 and 25. The end terminal 24 of the secondary winding 23 is connected to the center tap 57 of the windings 54 and 56 and the end terminal 25 of the winding 23 is connected to the emitters of the four transistors 31, 32, 33, and 34.

In the operation of the circuit of Fig. 2, the windings 37 and 41 function in a manner similar to the windings 13 and 16 of Fig. 1, to maintain the input currents to the transistors connected thereto equal despite differences in the input impedances of these transistors. Similarly, the windings 46 and 49 operate to maintain the input currents to the transistors 33 and 34 equal despite the tendency of one of these transistors to draw more input current than the other due to a lower input impedance. As in the circuit of Fig. 1, an unequal current flow through any one of these windings, compared to the current flow through the winding connected thereto, will induce a voltage in that winding which will tend to oppose the current flowing therein and induce a voltage across the other winding which will tend to increase the current flow in that winding. The windings 54 and 56 function in a manner similar to the windings 37 and 41 and the windings 46 and 49 and maintain the current flow through these two pairs of windings equal despite the tendency of one pair of transistors to draw more input current than the other pair. In this manner, the circuit of Fig. 2 permits the operation of four transistors in parallel despite differences in the input impedances of the transistors and assures approximately equal current distribution to the load if the transistors employed have approximately equal current gains. It should be noted that this method of parallel transistor operation can be extended to permit parallel operation of 8, 16, or any number of transistors equal to a power of two.

Figure 3:
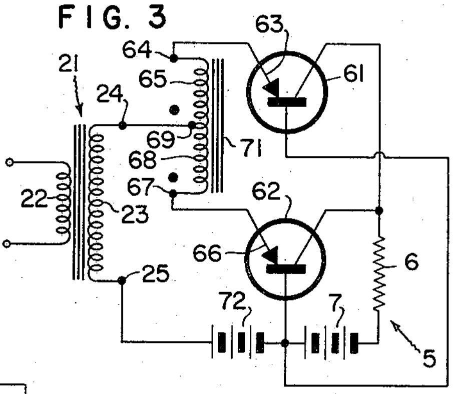
Fig. 3 is a circuit diagram of an embodiment of the present invention where two transistors, connected in the common base configuration, are operated in parallel.

Referring now to Fig. 3, there is shown an embodiment of the present invention employed to permit the parallel operation of two transistors connected in the common base configuration. This circuit employs a pair of transistors 61 and 62 as its amplifying elements. As shown, the collector of each of said transistors is connected to one end terminal of a load circuit 5, comprising a series connected load resistor 6 and a source of transistor energizing current 7. The base electrode of the transistor 61 and the base electrode of the transistor 62 are connected to the other end terminal of the load circuit 5. The emitter 63 of the transistor 61 is connected to an end terminal 64 of a winding 65 and the emitter 66 of the transistor 62 is connected to an end terminal 67 of a winding 68. The other end terminals of the windings 65 and 68 are connected together to form a center tap 69. Again the windings 65 and 68 are unductively coupled to each other and wound on a common core 71 in the same manner as the windings 13 and 16 are wound on the core 18 in Fig. 1.

As in the circuit of Fig. 1 the input to the circuit of Fig. 3 is by way of the input transformer 21 having the primary winding 22 and the secondary winding 23 with the end terminals 24 and 25. The end terminal 24 of the secondary winding 23 is connected to the center tap 69 of the windings 65 and 68. The end terminal 25 of the secondary winding 23 is connected to the base electrodes of the transistors 61 and 62 through a source of emitter bias current, the battery 72.

The operation of the circuit of Fig. 3 is similar to the operation of the circuits of Figs. 1 and 2 in that an unequal input current flowing in one of the windings 65 or 68 will induce voltages across these windings of such polarities as to reduce the input signal voltage to the transistor drawing the larger input current and to increase the input signal voltage to the transistor drawing the smaller input current. Thus, by the adoption of the construction shown in Fig. 3, it is possible to equalize the input currents to transistors having different input impedances when such transistors are connected in parallel in the common base configuration.

Figure 4:
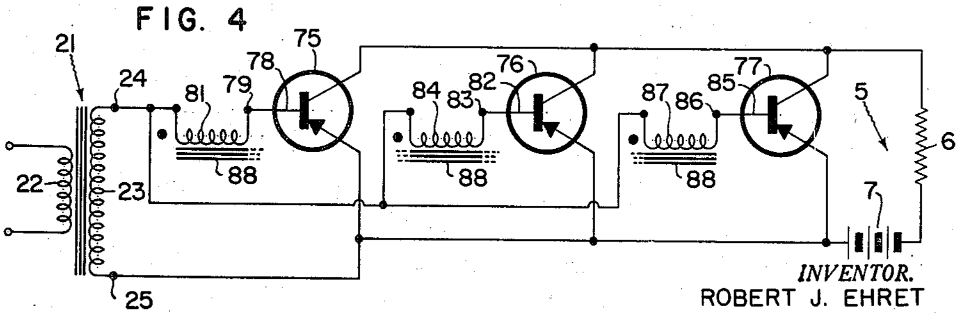
Fig. 4 is a circuit diagram of an embodiment of the present invention wherein three transistors, connected in the common emitter configuration, are operated in parallel.

Referring now to Fig. 4 there is shown a circuit diagram of an embodiment of the present invention wherein three transistors 75, 76, and 77, connected in the common emitter configuration, are operated in parallel. As shown, the collector of each of these transistors is connected to one end terminal of a load circuit 5 comprising a load resistor 6 and a source of transistor energizing current 7. The emitter of each of said transistors is connected to the other end terminal of the load circuit 5. The base 78 of the transistor 75 is connected to an end terminal 79 of a winding 81. Similarly, the base 82 of the transistor 76 is connected to an end terminal 83 of a winding 84 and the base 85 of the transistor 77 is connected to an end terminal 86 of a winding 87. The windings 81, 84, and 87 are inductively coupled to each other and wound on a core 88 in such a manner that equal currents flowing in the same direction in each of said windings will not induce any E. M. F. in any of said windings. Such a core might take the form of the letter Y.

The signal input to this circuit is by way of the input transformer 21 having the primary winding 22 and the secondary winding 23 having end terminals 24 and 25. As shown, the end terminal 24 of the secondary winding 23 is connected to the other end terminal of each of the windings 81, 84, and 87. The end terminal 25 of the secondary winding 23 is connected to the emitter electrodes of each of said transistors. The operation of the circuit of Fig. 4 is similar to the operation of the circuits of Figs. 1, 2, and 3, in that an increase in the current at any one of the windings 81, 84, or 87 above that in the other windings induces a voltage which tends to reduce the current in that winding and increases the currents in the other windings. Thus the windings 81, 84, and 87 tend to make the base currents of the transistors 75, 76, and 77 equal despite differences in their input impedances. It should be noted, that this method of equalizing transistor input currents can be applied to any number of transistors operated in parallel by supplying a winding for each of the transistors employed on an appropriate core.

Figure 5:
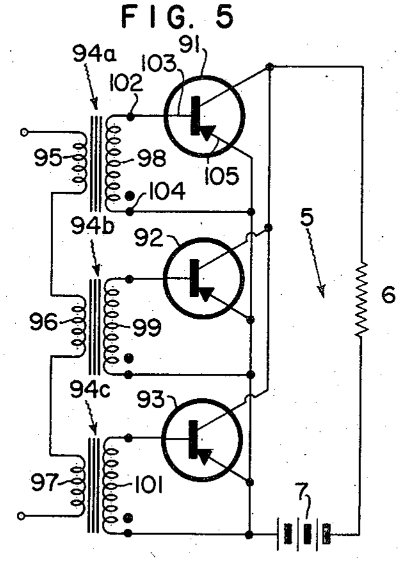
Fig. 5 is a circuit diagram of a modification of the embodiment of the present invention shown in Fig. 4.

Referring now to Fig. 5 there is shown another embodiment of the present invention wherein a plurality of transistors may be operated in parallel. This embodiment of the present invention employs the transistors 91, 92, and 93 as its amplifying elements. As shown, the collector-emitter circuit of each of said transistors is connected in parallel to a load circuit 5 comprising a load resistor 6 and a source of transistor energizing current 7.

The signal input to the circuit of Fig. 5 is by way of three input transformers *94a*, *94b*, and *94c*. The input transformers *94a*, *94b*, and *94c* have series connected primary windings 95, 96, and 97. In addition, the input transformers *94a*, *94b*, and *94c* have secondary windings 98, 99, and 101, respectively. An end terminal 102 of the secondary winding 98 is connected to the base electrode 103 of the transistor 91 and the other end terminal 104 of the winding 98 is connected to the emitter 105 of the transistor 91. Similarly, the corresponding end terminals of the windings 99 and 101 are connected to the base and emitter electrodes of the transistors 92 and 93 respectively.

In the operation of the circuit of Fig. 5, the input transformers *94a*, *94b*, and *94c*, in addition to feeding the input signal to the three transistors, function to maintain the respective input currents to the transistors approximately equal despite differences in the transistors' input impedances. Any excess current flow in one or more of the windings will induce voltages across those windings such as to oppose the current flow therein and induce voltages across the other windings which will increase the current flow therein. In this manner, the three input transformers function to equalize input currents flowing through the three transistors. In this manner, the circuit of Fig. 5 insures that the transistors will contribute to the load current in proportion to their current gains despite differences in their respective input impedances. It should be noted, that the teachings of Fig. 5 can be extended to any number of transistors operated in parallel by providing a separate input transformer for each transistor so operated.

While the transistors shown in the drawings have been illustrated as p. n. p. junction type transistors, it should be understood that with appropriate changes in circuit polarities and parameters these transistors could be n. p. n. junction type transistors or point contact type transistors.

While, in accordance with the provisions of the statutes, there have been illustrated and described the best forms of the embodiment of the invention now known, it will be apparent to those skilled in the art that changes may be made in the forms of the apparatus disclosed without departing from the spirit of the invention as set forth in the appended claims and that in some instances certain features of the invention may be used to advantage without a corresponding use of other features.

Having now described this invention, what is claimed as new and for which it is desired to secure by Letters Patent is:

1. An amplifier employing as its amplifying elements two pairs of transistors, each of said transistors having an emitter, a collector, and a base, a series connected load circuit comprising a load and a source of transistor energizing current, the collector of each of said transistors being connected to one end terminal of said load circuit, the emitter of each of said transistors being connected to the other end terminal of said load circuit, a pair of series connected inductively coupled windings for each pair of said transistors, the end terminals of each of said series connected pairs of windings being connected to the base electrode of a corresponding one of said pair of transistors, a pair of series connected inductively coupled windings for each pair of said first named series connected inductively coupled windings, the end terminals of each of said windings being connected to the common terminals of a corresponding one of said first named pairs of windings, and input circuit means connected to the common terminals of said last named pair of windings and the emitter of each of said transistors.

2. An amplifier having a pair of input terminals adapted to be connected to an input signal source and a pair of output terminals adapted to be connected to a load circuit comprising a series connected load and a source of amplifier energizing current, said amplifier comprising in combination, a plurality of transistors each having three electrodes, the first electrodes of each of said transistors being connected to one of said output terminals, the second electrode of each of said transistors being connected to the other of said output terminals, an inductive winding for each of said transistors, means connecting each of said inductive windings to the third electrode of one of said transistors, means for inductively coupling each of said windings to the others of said windings in such a manner that a current flow through any of said windings induces voltages across the others of said windings having similar polarities with respect to the transistor electrode connected thereto, means connecting the second of said electrodes of each of said transistors to one of said input terminals, and means connecting each of said inductive windings to the other of said input terminals.

3. In combination, a pair of transistors each having three electrodes, a source of transistor energizing current, a load, circuit means connecting two electrodes of one of said transistors and the two similar electrodes of the other of said transistors in parallel to said source and said load connected in series, a center tapped inductance, one end terminal of said inductance being connected to the third electrode of one of said transistors and the other end terminal of said inductance being connected to the third electrode of the other of said transistors, and an input circuit, said input circuit being connected to the center-tap of said inductance and to one of said first mentioned electrodes of both of said transistors.

4. In combination, a pair of transistors each having an emitter, a collector, and a base, a source of circuit energizing current, a load, the emitter and collector of each of said pair of transistors being connected in parallel to said load and said source connected in series, a pair of inductively coupled windings, one end terminal of one of said windings being connected to the base of one of said transistors, one end terminal of the other of said windings being connected to the base of the other of sadi transistors, and an input circuit, said input circuit being connected to the emitter of each of said transistors and to the other end terminals of both of said windings, the polarity of said inductive windings being such that an unequal current flow through one of said windings compared to the current flow in the other of said windings will induce therein a voltage which will oppose the current flow therein and aid the current flow in the other of said windings.

5. In combination, a pair of transistors each having an emitter, a collector, and a base, a load circuit comprising a circuit load and a source of transistor energizing current, means connecting the collector-base circuit of each of said transistors to said load circuit, an input circuit, means connecting said input circuit to the base of each of said transistors, a pair of series connected inductively coupled windings, one end terminal of said pair of windings being connected to the emitter of one of said transistors the other end terminal of said windings being connected to the emitter of the other of said transistors, and means connecting said input circuit to the common terminals of said windings.

6. An amplifier comprising in combination a plurality of transistors each having an emitter, a collector, and a base, a series connected load circuit comprising a load and a source of transistor energizing current, means connecting the collector electrode of each of said transistors to one end terminal of said load circuit and means connecting the emitter electrode of each of said transistors to the other end terminal of said load circuit, an input transformer for each of said transistors, means connecting a similar end terminal of each of the secondary windings of said transformers to the base of a corresponding one of said transistors, and means connecting the emitter electrode of each of said transistors to the other end terminal of said corresponding secondary windings, the primary windings of said transformers being connecting in series.

7. An amplifier comprising in combination a plurality of transistors each having three electrodes, a load, a source of transistor energizing current, circuit means connecting the first and second electrodes of each of said transistors in parallel with said load and said source, an inductive winding for each of said transistors, each of said windings being wound on a common core in such a manner that equal currents flowing in the same direction in each of said windings do not induce any net E. M. F. in any of said windings, the same end terminal of each of said windings being connected to the third electrode of a corresponding one of said transistors, and an input circuit, said input circuit being connected to the other end terminal of each of said windings and to the second electrode of each of said transistors.

8. An amplifier comprising in combination a plurality of transistors each having an emitter, a collector, and a base, a series connected load circuit comprising a load and a source of transistor energizing current, means connecting the collector of each of said transistors to one end terminal of said load circuit, means connecting the emitter electrode of each of said transistors to the other end terminal of said load circuit, and an input transformer for each of said transistors having a primary winding and a secondary winding, said primary winding being connected in series, each of said secondary windings having a similar one of its end terminals connected to the base of a corresponding one of said transistors and having its other end terminal connected to the emitter of a corresponding one of said transistors.

9. An amplifier comprising in combination a plurality of transistors each having three electrodes, a series connected load circuit comprising a load and a source of transistor energizing current, means connecting the first electrode of each of said transistors to one end terminal of said load circuit, means connecting the second electrode of each of said transistors to the other end terminal of the load circuit, and an input transformer for each of said transistors having a primary winding and a secondary winding, each of said secondary windings having a similar one of its end terminals connected to the third electrode of a corresponding one of said transistors and having its other end terminal connected to the second electrode of a corresponding one of said transistors, said primary windings being connected in series.

References Cited in the file of this patent

UNITED STATES PATENTS

| | | |
|---|---|---|
| 490,178 | Thomson | Jan. 17, 1893 |
| 1,830,210 | Oswald et al. | Nov. 3, 1931 |
| 2,646,472 | Rockwell | July 21, 1953 |
| 2,751,446 | Bopp | June 19, 1956 |